United States Patent
Bolton et al.

[11] 4,275,858
[45] Jun. 30, 1981

[54] PANEL BREAKING SYSTEMS

[75] Inventors: Colin B. Bolton, Fleet; Harry D. Rylands, Woking; Clara Turner; Henry W. Turner, both of Ashtead, all of England

[73] Assignee: The Secretary of State for Defence in Her Britannic Majesty's Government of the United Kingdom of Great Britain and Northern Ireland, London, England

[21] Appl. No.: 945,106

[22] Filed: Sep. 25, 1978

Related U.S. Application Data

[63] Continuation-in-part of Ser. No. 670,531, Mar. 25, 1976, abandoned, and Ser. No. 838,451, Oct. 3, 1977, abandoned.

[51] Int. Cl.³ .................................................. B64C 1/32
[52] U.S. Cl. .............................. 244/121; 244/122 AF; 89/1 B
[58] Field of Search ............. 244/121, 129.3, 122 AF; 49/141; 52/98; 102/28 R, 28 EB, 206, 218; 361/248, 250, 251; 89/1 B

[56] References Cited

U.S. PATENT DOCUMENTS

| | | |
|---|---|---|
| 667,435 | 2/1901 | Friese-Greene et al. .......... 102/28 R |
| 3,022,732 | 2/1962 | Paley ................................ 102/70.2 R |
| 3,143,069 | 8/1964 | Ostrow ............................. 102/28 EB |
| 3,166,689 | 1/1965 | Buntenbach ................ 102/28 EB X |
| 3,230,885 | 1/1966 | Weber et al. ......................... 89/1 B |
| 3,264,990 | 8/1966 | Betts ................................ 102/28 EB |
| 3,340,807 | 9/1967 | Burr et al. .................... 102/28 EB X |
| 3,409,804 | 11/1968 | Bankston ..................... 102/28 EB X |
| 3,503,333 | 3/1970 | Esttes .................................. 102/28 R |
| 3,638,035 | 1/1972 | Murphy et al. .................. 361/251 X |
| 3,729,154 | 4/1973 | Deplante ....................... 244/122 AF |
| 3,806,069 | 4/1974 | Galton ........................... 244/122 AF |
| 3,885,761 | 5/1975 | Pendergast et al. ................. 244/121 |

OTHER PUBLICATIONS

*The International Dictionary of Physics and Electronics* 2d, Ed., D. Van Nostrand Co., Inc., Princeton, New Jersey, 1961, p. 177.

*Primary Examiner*—Galen L. Barefoot
*Attorney, Agent, or Firm*—Kerkam, Stowell, Kondracki & Clarke

[57] ABSTRACT

A Panel Breaking Apparatus comprising at least one fusible conductor having at least one region of increased fusibility and embedded in intimate contact with the panel material and connected to a source of electrical power operable to produce a high-energy pulse of current sufficient to fuse the conductor and thus to break the panel.

4 Claims, 11 Drawing Figures

PANEL BREAKING SYSTEMS

This application is a continuation-in-part of Applications Ser. Nos. 670,531 and 838,451, filed on Mar. 25, 1976 and Oct. 3, 1977 respectively now abandoned.

BACKGROUND TO THE INVENTION

The present invention relates to means enabling the escape of personnel from vehicles and craft, particularly aircraft, and especially through canopies and windscreens.

Aircrew escape from modern high speed aircraft is generally achieved with an ejection seat which projects its occupant out of the aircraft at a high speed and trajectory commensurate with the need to avoid impact with other parts of the fuselage, to reduce the effects of air blast, and to carry the occupant well clear of a possibly exploding aircraft. It is thus requisite that the usual canopy above the head of the airman be opened as rapidly as possible, usually faster than for normal entry or exit. In order to do this the canopy may be opened or removed bodily by mechanisms similar to that used for the ejection seat, even this may not be sufficiently rapid. Appreciable time can be saved if, instead of removing the canopy as a whole, an opening is cut in it through which seat and occupant can pass. This in itself presents difficulties since canopies are usually made of tough material to withstand cabin pressurisation and impact by birds etc.

One apparatus for cutting an opening in a cockpit canopy involves the use of explosive cord such as is described in U.S. Pat. No. 3,806,069. Because of the toughness of the canopy this is however apt to be bulky and thus liable to restrict vision. Moreover its operation can entail spattering of the person with undesirable substances. It is also difficult of testing, over a long term, that a particular installation is still viable.

SUMMARY OF THE INVENTION

According to the present invention a cockpit canopy breaking apparatus comprises:

a plurality of fusible electrical conductors each incorporating at least one region of reduced energy of fusion.

The conductors are embedded in and in intimate contact with the canopy whereby the conductor is operable to explode and generate a crack in the canopy.

At least one source of a pulse of high energy electrical power is provided with switch means for connecting the at least one source to the conductors.

It will be appreciated that the cockpit canopy in this specification is one which is frangible by the means described and will normally therefore be made of a plastics material of low electrical conductivity. The invention is particularly suitable for use with polymethyl methacrylate and polycarbonate canopies.

The effect of such a pulse of current in an emergency is under the control of the same mechanism as used to operate the ejection seat, is to produce explosion of the conductor with consequent dissipation of energy and production of an explosive shock sufficient to crack the material of the canopy and form the required opening. In addition to the explosive shock, a degree of thermal shock is simultaneously experienced which assists in commencing panel cracking. The crack or cracks are propagated by mechanical shock/flexure waves through the material. The generation and propagation of cracks can be carried out by means of the present invention much more efficiently and under much more closely controlled conditions than by the use of explosive cord. Moreover, as the conductors need have only a very small cross-section they can afford much less of an obstruction to vision than explosive cord. The conductors may be in the form of wire or tape.

The regions of reduced energy of fusion which will rupture preferentially, or before the remainder of the conductor under high power discharge conditions may comprise sharp bends in the conductor. Since V form bends will direct cracks along a median line of the V, it follows that a system of fusible elements, each having one or more V form bends, can be disposed to create a desired mode of shattering. In a typical aircraft canopy context there is indeed a desired mode of cracking; above the head and shoulders of the ejecting escaper the broken pieces, and hence their momentum, should be small enough not significantly to damage the person or vital equipment, while to the sides larger pieces can be tolerated. A system of fusible elements in accordance with the invention can readily be arranged to effect this without being visually obstructive, particularly since this mode of directing cracks means that the conductor can be disposed in the panel at locations which are of at least practically minimum sensitivity from the visual obstruction point of view. By using V-shaped bends in the conductor cracks can be propagated over great distances in the panel material, particularly when using a high energy pulse for shattering the material of the panel. This is because the plasma energy in the arc formed upon disruption of the conductor is directed along the median line of the angle of the bend in the conductor. Alternatively the regions of reduced energy of fusion may be short lengths of reduced cross-section, or be constituted by discrete conductor elements in contact. Small constrictions along the length of the conductor have the effect of producing highly localised dissipation of energy at the location of such constrictions.

Conductors in tape form and having constrictions at intervals along the operative length thereof have been found particularly useful, in the sense of minimising energy input and controlling crack extent and geometry, because the constrictions act as crack initiators and the plane of the tape, that is, the plane of the tape faces as distinct from the edges thereof, is normally the plane of the propagated crack. Consequently the energy input can be further minimised by embedding such tape in a canopy with its plane normal to the surface thereof. Generally in the aircraft cockpit canopy context this will afford the added advantage of further minimising any visual obstruction. However little will usually be lost if the tape is embedded, so that its plane lies in the line of user's vision. This, in the region of the canopy in the ejection path, will be substantially normal to the local surface.

A suitable method of forming an aircraft cockpit canopy in accordance with the invention includes the steps of providing an inner shell and an outer shell, forming a layer of resin on one of the inner surfaces, embedding the tape in the resin in the desired configuration, placing the other shell over the resin, and curing. In this way it may be possible to have tapes crossing one another in order to break out distinct areas of panel, without the tapes contacting one another. Alternatively a zig-zag pattern, with tapes almost touching at the nodes, may be adequate.

By using V-shaped bends in the conductor cracks can be propagated over great distances in the panel material, particularly when using a high energy pulse for shattering the material of the panel. This is because the plasma energy in the arc formed upon disruption of the conductor is directed along the median line of the angle of the bend in the conductor. V bends and constrictions may be employed in consort, and the effect of a V bend can be further enhanced by placing a constriction at the apex of the V.

The conductor is preferably embedded within the thickness of the panel during manufacture since this enables the most efficient transmission of the released energy into the material of the panel. As alternatives to the method described above, which may be used with conductors having any form of region of reduced energy of fusion, the conductor may be placed directly between layers of a laminated structure or by moulding the conductor directly into the panel. The conductor may also be embedded subsequent to manufacture by locating it in a groove or channel in the surface of the panel and subsequently filling this groove or channel.

While the panel breaking means may merely so craze the canopy that the person may be safely ejected through it, it is sometimes preferable for it to be arranged completely to shatter the canopy. This is best accomplished by a combination of strategic siting of elements as described above with a source of adequate energy.

Two types of escape may need to be catered for in a canopy breaking system. One is the ejection described above; the other is emergency egress which occurs when an aircraft has crash landed and the normal canopy opening means is inoperable or too slow of operation. This latter mode can be catered for by canopy removal means, that is means in accordance with the invention which separate at least most of the canopy from its frame, without necessarily shattering it. Alternatively it may be preferred to use an explosive cord system for the canopy removal means. More usually, however, emergency canopy removal is accomplished by explosive means operating on the canopy holding system.

A canopy breaking system in accordance with the invention may comprise both canopy shattering means and canopy removal means. These two sub-systems may be ganged for either purpose, ie upon ejection or upon emergency egress, both will operate.

Operation of the canopy shattering means will normally be one event in a sequence initiated when the escaper elects to eject, though there may be an additional fail-safe microswitch operated by the passage of an ejector seat. The circuit for a canopy removal system may include two manual switches in parallel, one for operation by the escaper and the other, perhaps beneath a removable or frangible exterior panel, for operation from outside.

Of course either sub-system may be connected to act as an emergency or fail-safe back-up for the other.

The energy required depends on the type of operation required and also the thickness and material of the panel. Other variables which affect the required energy are the dimensions of the conductor (length and cross-sectional area) and also any variations in the geometry of the pattern. As a typical experimental example, a panel of acrylic canopy material about 10 mm thick was formed by placing a layer of acrylic resin on an acrylic sheet, embedding into the resin a pair of silver tapes 1.25 m $\times$ 0.04 mm cross section 100 mm long in the form of a polygon and with the plane of the tapes normal to the surface of the sheet, attaching a second acrylic sheet to the resin and curing. The tapes had constrictions to 0.2 mm $\times$ 0.04 mm cross-section 2 mm long at 20 mm intervals. The panel was cracked from surface to surface along the perimeter of the polygon by an energy of 1 joule.

Different conductor materials require differing amounts of energy to fuse. The particular physical constant of import in this case is the Joule integral ($i^2 dt$) for melting. This is a function of, among other things, material and the cross-sectional area of the conductor used to initiate the discharge. A material having a comparatively low Joule integral for melting for a given cross-section, and which may therefore be preferred, is tin. The integral increases from tin through nichrome, iron, eureka, zinc, lead, aluminium, silver and copper in that order. It has however been found that silver, which is readily available accurately made in the tape form described above, gives good results with manageable energy input, not least because the small cross-sectional area of the tape, which minimises the required energy, is also advantageous from the visual point of view. Because the Joule integral is proportional to the square of the cross-sectional area the small constrictions referred to above have the effect of producing highly localised dissipation of energy.

A variety of types of electrical power source are available capable of delivering the necessary amount of energy in the necessary short time interval. For example, sources using capacitively stored energy or inductively stored energy are suitable as are also short time rated generators and thermal batteries. A very economical form of power source consists of capacitively stored energy matched to an inductance which is excited by the flow of energy from the capacitor during the melting time of the element chosen, this form being particularly useful in creating the plasma projection in a V formed element. Capacitors with a high power/weight ratio, such as electrolytic or ceramic capacitors, may be used as distinct from the conventional heavier plate type. Within the context of a military aircraft the power source may include that of the radar system, which generally operates at a voltage sufficiently high for this emergency system.

There are several modes of supply, any one or combination of which may be preferred dependent on the circumstances. For example capacitors may be charged prior to flight by either a ground or aircraft-mounted engine starter unit, the charge being subsequently maintained by a trickle charger deriving power from a busbar. In another example, where a source of medium to high voltage (say 1–2 kV) is available, capacitors may until an emergency arises be maintained in a discharged or undercharged condition. Initiation of the emergency escape system may then be arranged to permit the capacitor to be charged within a fraction of a second and then discharged to operate the panel breaking system. The arrangement may include a delay circuit operating on a time or ejector seat position basis or on sensing that the capacitor has reached a certain charge. Another example is that mentioned above, the use of an indigenous high energy source. In this case capacitive storing may not be needed, though it may be employed if it is thought possible for the emergency not to arise until after the high energy source had ceased to be available.

Capacitors, if used, are preferably connected in parallel across supply, to minimise supply voltage, with arrangements made for minimising the effect of a leak developing in one capacitor. In order to minimise the danger from heavily charged capacitors the or each element may be supplied by a bank of capacitors arranged to be charged in parallel and discharged in series. The fusible elements, switches and inductances if used are then connected in sub-circuits across the capacitors, the switches being ganged for simultaneous operation. In a system having canopy shattering and canopy removal sub-systems, each capacitor is advantageously shared between the sub-circuits of the two sub-systems.

Successful shattering has been achieved with capacitors between 4 $\mu$F and 60 $\mu$F at voltages up to 7.5 kV in combination with inductance up to 110 $\mu$H, and also with capacitors of an electrolytic type up to 30,000 $\mu$F capacity at voltages up to 50 V conjunction with inductances up to 3.3 mH, but the invention is by no means limited to this particular range of values.

Means are also preferably provided for discharging the capacitors to earth when a charge is no longer required on them. The discharge means may comprise a switch, advantageously biassed open, and a resistor. Alternatively the discharge means may comprise a leak circuit. A leak circuit whereby substantially full charge is maintained on the capacitors for a few minutes before commencement of the discharge proper may be of advantage. A warning light may be employed to indicate that the capacitors are charged.

Although the use of capacitors has many attractions a major disadvantage associated with them is that they are likely to require bulky insulation.

In alternative embodiments of the present invention the source of power consists essentially of power supply means and an inductance, the apparatus being such and so arranged in a circuit that upon initiation by the switch current from the power supply means charges the inductance with energy in order to provide a pulse from the inductance to fuse the conductor and thereby crack the panel.

This may be realized in a simple circuit having just the one switch and wherein the inductance, power supply, the fusible conductor and general circuit characteristics are so matched that in operation the rise in current from the power supply takes the same time to fuse the conductor as fully charging the inductance for self excitation.

In an alternative realization the circuit may have a by-pass switch in a sub-circuit by-passing the fusible conductor until the inductance is charged.

The simple circuit realization has the advantage of operation as rapid as is possible, in addition to any accruing from the minimisation of the number and bulk of the components. It has the disadvantage of requiring integrity of the fusible conductor until the inductance generated pulse arrives, which may mean making the fusible conductor more substantial than the direction and magnitude of its explosion would require. It also has a disadvantage in the fact that the dimension and physical properties, eg resistivity may have to remain constant, at least with respect to each other, over a long period of time and without adequate means of ascertaining that they have.

The alternative realization does not, within certain limitations, rely on the integrity of the fusible conductor or on the matching of the components of the circuit. Moreover in the particular context of concern, the shattering of an aircraft cockpit in an aircrew ejection sequence, more time is usually available between the initiation of the sequence and the moment when the canopy needs to be shattered than is required to operate a simple circuit realization of the invention. Consequently the alternative realization is preferred in this context. The by-pass switch may be located for operation by the passage of an ejector seat, thus securing accurate coordination with the movement of the airman. It should be borne in mind with respect to this alternative realization that the cross-sectional area of the conductor is preferably nowhere so small that considerable energy can be lost by restriking of the arc across the contacts of the by-pass switch due to high voltage generated by the arc at the exploding constriction. An aspect ratio (ratio of normal to constriction cross-sections) of between 3 and 5 to 1 should be adequate.

As in the capacitively operated embodiments described above it is also preferred in the alternative embodiments that the apparatus includes a plurality of fusible conductors in a plurality of sub-circuits each sub-circuit having a distinct switch and inductance. In this way a desired shattering pattern can readily be arranged and also adequate fracture can be obtained even in the event of failure of a small proportion of the sub-circuits.

The source of power may be a battery or a generator. In the aircraft context it may be the aircraft's main electrical supply apparatus and be supplied via the bus-bar system. As it is preferred that a plurality of sub-circuits are used it is also preferred for each sub-circuit to have a distinct battery or other dc current source.

If two modes of fracture need to be catered for, such as for example canopy shattering and canopy separation as mentioned above a system of switches linking the different fusible elements with common inductance and power supply means circuit elements may be employed. Alternatively cockpit canopy shattering may be accomplished by means according to the present invention while for separation of the canopy from its frame miniature detonating cord as described in U.S. Pat. No. 3,806,069 is employed.

Canopy breaking systems will now be described by way of example with reference to the accompanying drawings.

DESCRIPTION OF THE PREFERRED EMBODIMENTS

Figure 1:
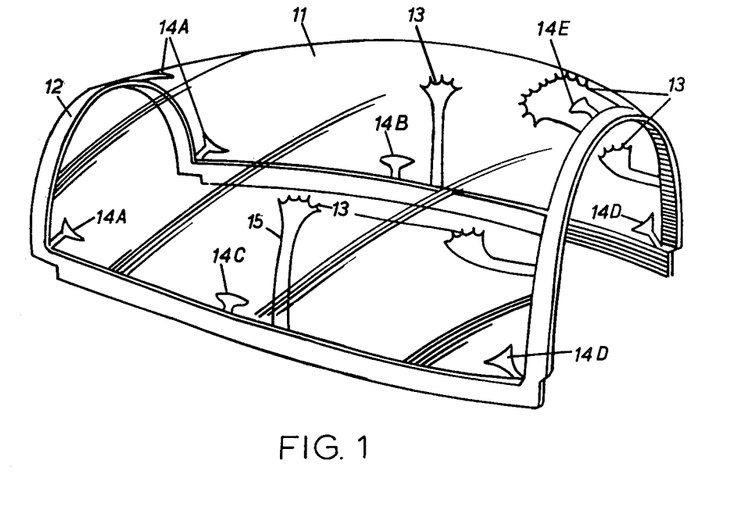
FIG. 1 is a view in perspective of an aircraft cockpit canopy fitted with one form of fusible elements in canopy breaking and canopy shattering subsystem.

As shown in FIG. 1 an aircraft cockpit canopy comprises a transparent panel 11 in a frame 12. Embedded in the panel are five fusible elements 13 in a canopy shattering sub-system and eight fusible elements 14 in a canopy removal sub-system.

The elements 13 are strategically sited around the area of the canopy in an aircrewman's ejection path, in positions where their effect upon vision is minimised. The elements comprise tin tape 1 mm×0.08 mm×300 mm long formed with a plurality of V bends pointing around and across the said area in such a manner that upon operation enough cracks will be generated (along the median lines of the V's) in the area to break it into pieces which will have insufficient mass significantly to damage the person or vital equipment. Leads 15 which connect the elements 13 into the sub-system circuit are formed of relatively highly conductive physically frangible material.

Figure 3:
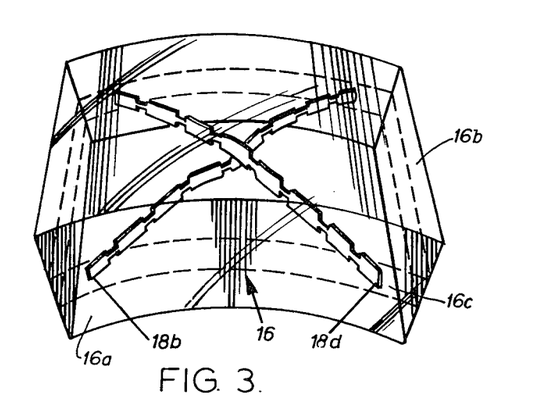
FIG. 3 is a view in perspective of a detail of the FIG. 2 embodiment canopy shattering subsystem.

The elements 14 are sited around the edge of the panel 11. Each comprises tin tape 1 mm×0.08 mm×100 mm formed with two V bends each pointing in an opposite direction along the perimeter of the panel. These V bends are as illustrated in FIG. 3, that is the elements are also reduced to about ⅓ cross-section at the apex of the V.

Figure 2:
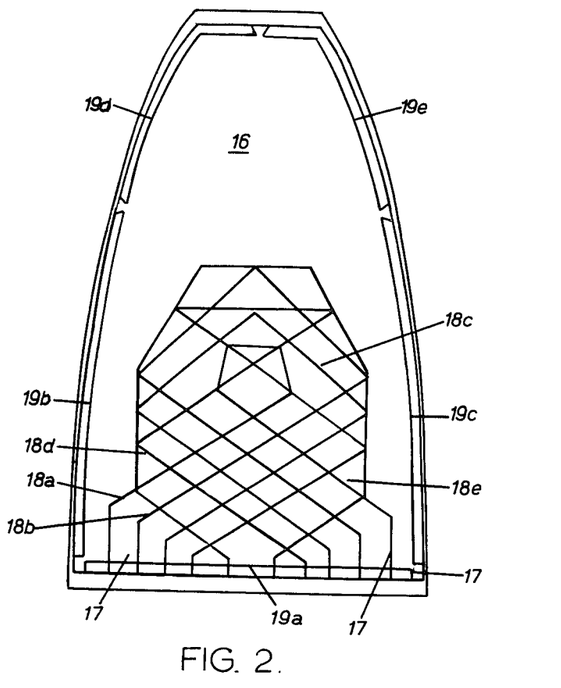
FIG. 2 is a plan view of an aircraft cockpit canopy fitted with another form of fusible elements in canopy breaking and canopy shattering subsystem.

The aircraft cockpit canopy 16 shown in plan view in FIG. 2 carries shattering and removal sub-systems formed in metal tape embedded with its plane normal to the local surface of the canopy. In the shattering sub-system connectors 17 lead to five conductors 18a–e disposed in a pattern which defines and criss-crosses an area of the canopy in the path of an ejecting user. FIG. 3 illustrates the disposition of the tape in the panel. Where tapes cross one another they are deflected from a middle path so as not to touch. As in the FIG. 1 embodiment the pattern of conductors is such that the pieces of canopy shattered out will be small in size and momentum and that adequate shattering of the canopy will result if two of the conductors fail to fuse.

In the canopy removal sub-system there are five conductors 19a–e forming almost a continuum around the canopy edge.

Figure 4:
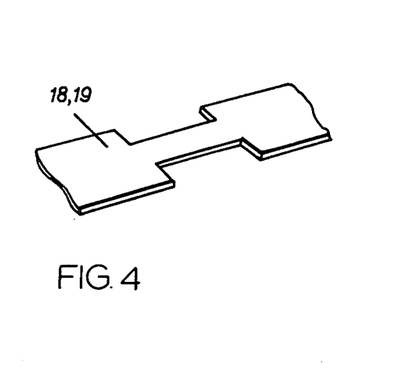
FIG. 4 illustrates one form of reduced energy of fusion region in a fusible conductor.
Figure 5:
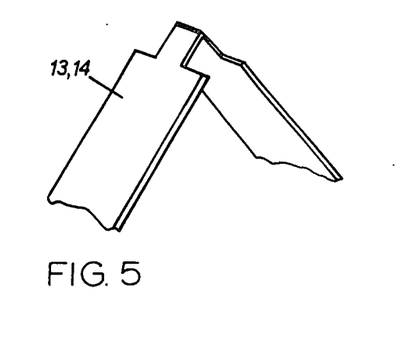
FIG. 5 illustrates another form of reduced energy of fusion region in a fusible conductor.

The conductors 18 and 19 comprise silver tape 1.25 mm×0.04 mm in cross-section having 2 mm long constrictions to 0.2 mm×0.04 mm at 50 mm intervals. The constrictions thus resemble somewhat those shown in FIG. 4. The tapes are embedded in a middle layer of the canopy material with the plane thereof normal to the local plane of the canopy surface. A suitable method of construction of the canopy shown in FIG. 1 is to cut grooves in the preformed canopy where the fusible elements 13 and 14 are to lie, lay the elements in the groove in the desired configuration, fill the grooves with a resin of canopy material, and cure.

In a preferred method of construction of the canopy illustrated in FIGS. 2 and 3, two canopy shells, an inner 16a and an outer 16b, are formed. Resin 16c is coated on one of the mating surfaces and the fusible elements emplaced. The other shell is then emplaced and the canopy assembly thus formed cured.

In an alternative method of construction the whole canopy is cast with the fusible elements in situ.

Figure 6:
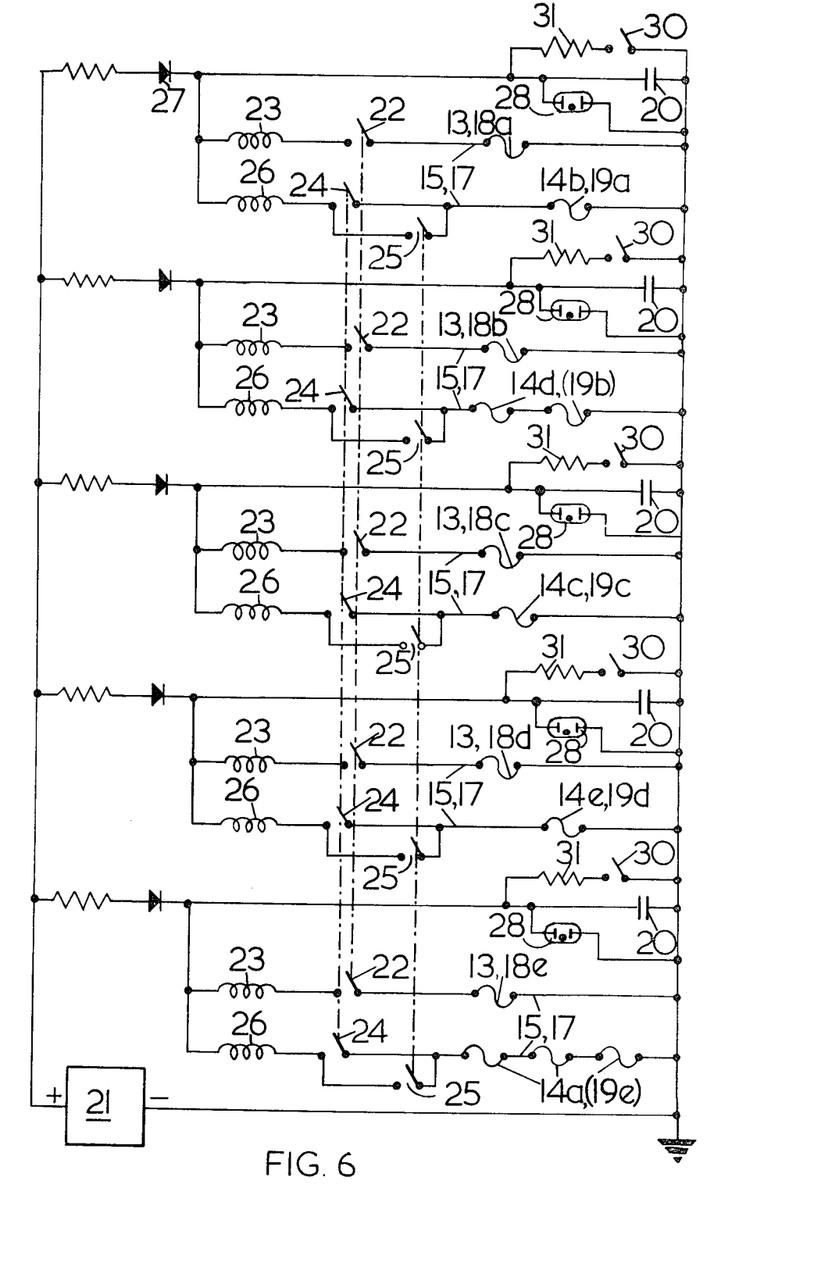
FIG. 6 is a circuit diagram of an embodiment of the invention relying on capacitive discharge.

The circuit shown in FIG. 6 comprises five ceramic 60 μF capacitors 20 connected in parallel across a supply 21. Each capacitor 20 constitutes a power source for fusing elements within the canopy removal and canopy shattering sub-systems. Thus, connected across each capacitor 20 is a switch 22 a 30 μH inductance 23 and, via leads 15 an element 13, (or, in the FIG. 2 embodiment 18), in the shattering sub-system, and switches 24 and 25 in parallel, a 30 μH inductance 26 and at least one element 14 (or 19) in the canopy removal sub-system. The switches 22 are ganged for simultaneous operation automatically as part of an ejection sequence. The switches 24 are ganged for simultaneous operation manually by the aircrewman and the switches 25 are ganged for operation externally of the cockpit.

Within the FIG. 1 embodiment canopy removal sub-system the three forward elements 14a are connected in series in one sub-system circuit, the centre side and centre rear elements 14b, c, e, are each connected in separate sub-system circuits, and the two rear corner elements 14d are connected in series in another sub-system circuit, the five sub-system circuits thus made each being serviced by one of the capacitors 20. In the FIG. 2 embodiment the conductors 19a–e are connected one into each of the sub-systems circuits.

Figure 11:
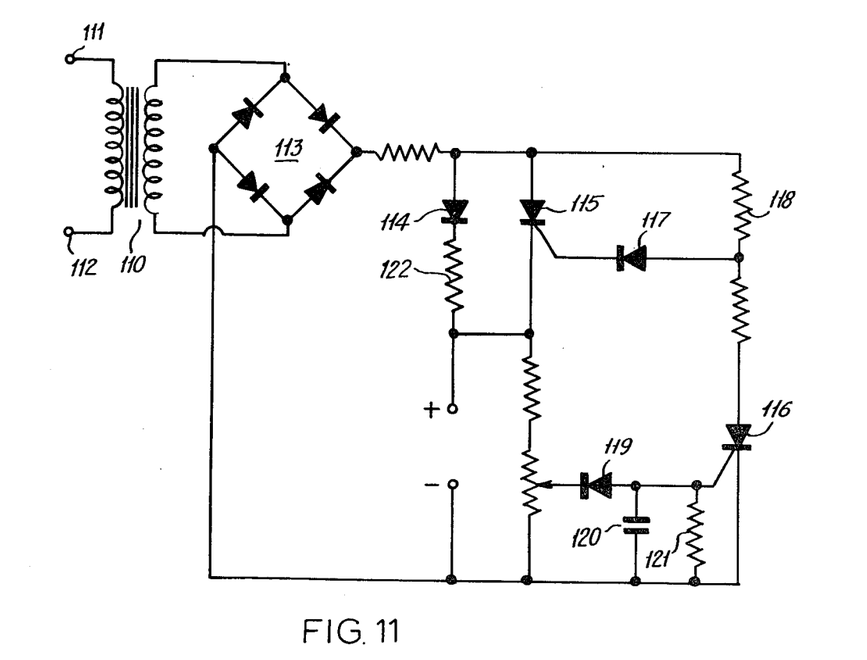
FIG. 11 is a trickle change circuit.

A trickle charger supplied via an aircraft bus-bar forms part of the supply 21 and is arranged to maintain the charge on the capacitors 20. A suitable trickle charger circuit is illustrated in FIG. 11 and comprises a transformer 110 connected on the supply side between the bus-bar 111 and earth 112 and supplying a bridge rectifier 113. The output of the bridge rectifier passes to a diode 114, a thyristor 115 and a thyristor 116 in parallel. The main, and rapid, charging route is via the thyristor 115, triggered by diode 117 and resistor 118. The thyristor 116, triggered by diode 119, capacitor 120 and resistor 121, provides a protection against overcharging. Maintenance of the full charge on the capacitors 20 is provided by the diode 114 and resistor 122: the circuit shown in FIG. 6 would be connected at the + and − terminals in the FIG. 11 circuit. Charging/blocking rectifiers 27 serve to restrict the effect of a leaky capacitor to its own sub-circuit. Warning lights 28, in the form of neons which strike at just below fully charged capacitor voltage, indicate that the capacitors are charged. A manually operable, biassed open, switch system 30 allows the capacitors to be discharged through resistances 31 to earth.

The system is prepared for use before an aircraft sortie by charging the capacitors 20 using a 4 kV supply across the supply 21 perhaps derived from a ground based engine starter unit. During the sortie the charge is maintained using the trickle charger.

In the event of an aircrewman initiating ejection, the switches 22 will be closed automatically within the ejection sequence, discharging the capacitors 20 through the inductances 23 and blowing the fuses 13 (or 16). In the FIG. 1 embodiment, due to the current surge self-excited by the inductance 23, an arc will be set up across the disrupting fuse portions at the apex of the V arrangement or arrangements, the plasma will be directed along the median line of the Vs to augment the shock caused by the fuse itself. The crack system resulting from the careful location and arrangement of the elements 13 will ensure that at least the portion of the canopy in the path of the ejecting crewman and his seat will be broken into small pieces. With the FIG. 2 embodiment cracks initiated at the constrictions will propagate from surface to surface of the canopy along the plane of the tapes. Insofar, in either embodiment, as the explosion energy and pressure difference between the cockpit interior and atmosphere do not propel the canopy pieces outwards, the seat and its occupant should manage to do so during ejection without any significant damage to the person. Judicious location of the elements within the canopy material, may assist in ensuring that the pieces are projected outwards.

If the aircraft crash lands the crewman will usually operate the rapid canopy removal sub-system rather than the normal opening means, and he will do so by closing the ganged switches 24. The capacitors 20 will then discharge through the inductances 26 and the elements 14 (or 19), breaking the canopy away from the same in a mode of operation similar to that of the shattering sub-system in either embodiment. If the crewman is unconscious the switch 25 may be operated by an external rescuer, with the same effect. The panel is then pushed, pulled or lifted away from its frame, breaking the connectors 15 in the shattering sub-system.

Upon normal landing for egress from the aircraft the crewman will operate the switch 30 to discharge the capacitors to earth and extinguish the warning light.

Figure 7:
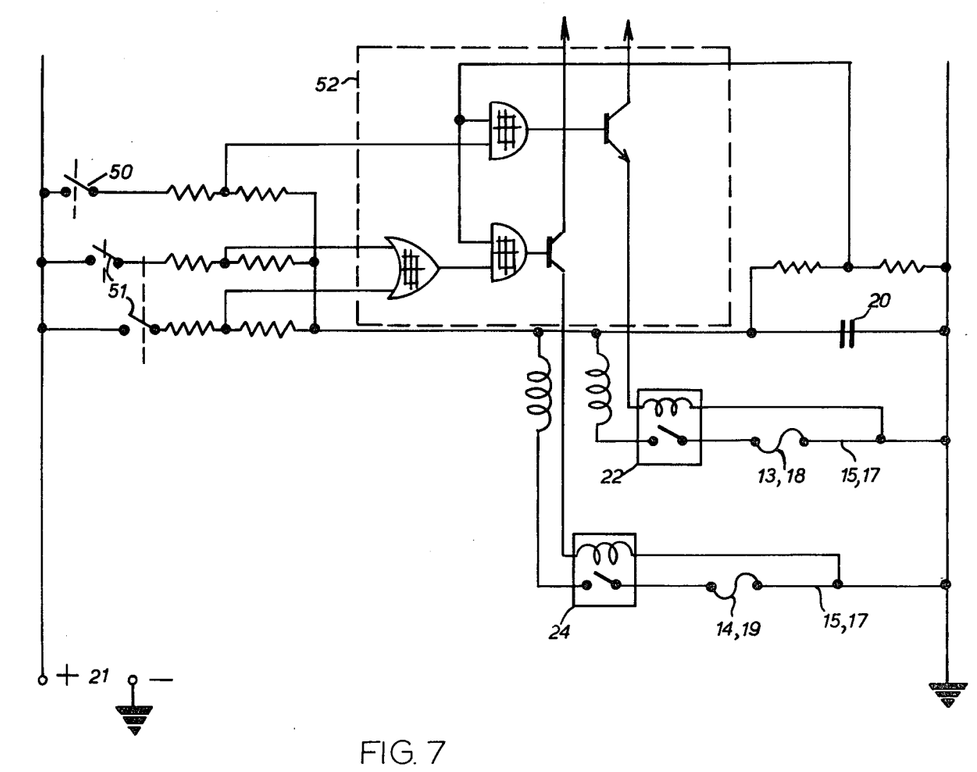
FIG. 7 is a circuit diagram of an embodiment of the invention relying on inductive discharge.

In an alternative circuit, illustrated in FIG. 7, the supply 21 is connected via a parallel switch system to a 2.5 kV source within the aircraft. The parallel switch system comprises an automatic switch 50 in the ejection sequence and associated with the shattering sub-system and two manual switches 51 associated with the removal sub-system. Each of these switches is connected via a delay system 52 with the appropriate switch, 22, 24, 25, which latter switches are not, in this instance, operable other than by the delay system. The switch 25 and the trickle charger are not required. The delay system includes a sensor that the capacitors have achieved a certain charge.

In operation of this alternative circuit the capacitors 20 are not charged prior to flight and in fact remain uncharged until required. Making of any of the switches in the said parallel switch system allows the supply to charge the capacitors and initiates operation of the delay system 52. After an appropriate fraction of a second, when the capacitor 20 will be adequately charged, the delay system will close the appropriate switch 22, 24 and operate the associated sub-system.

Figure 8:
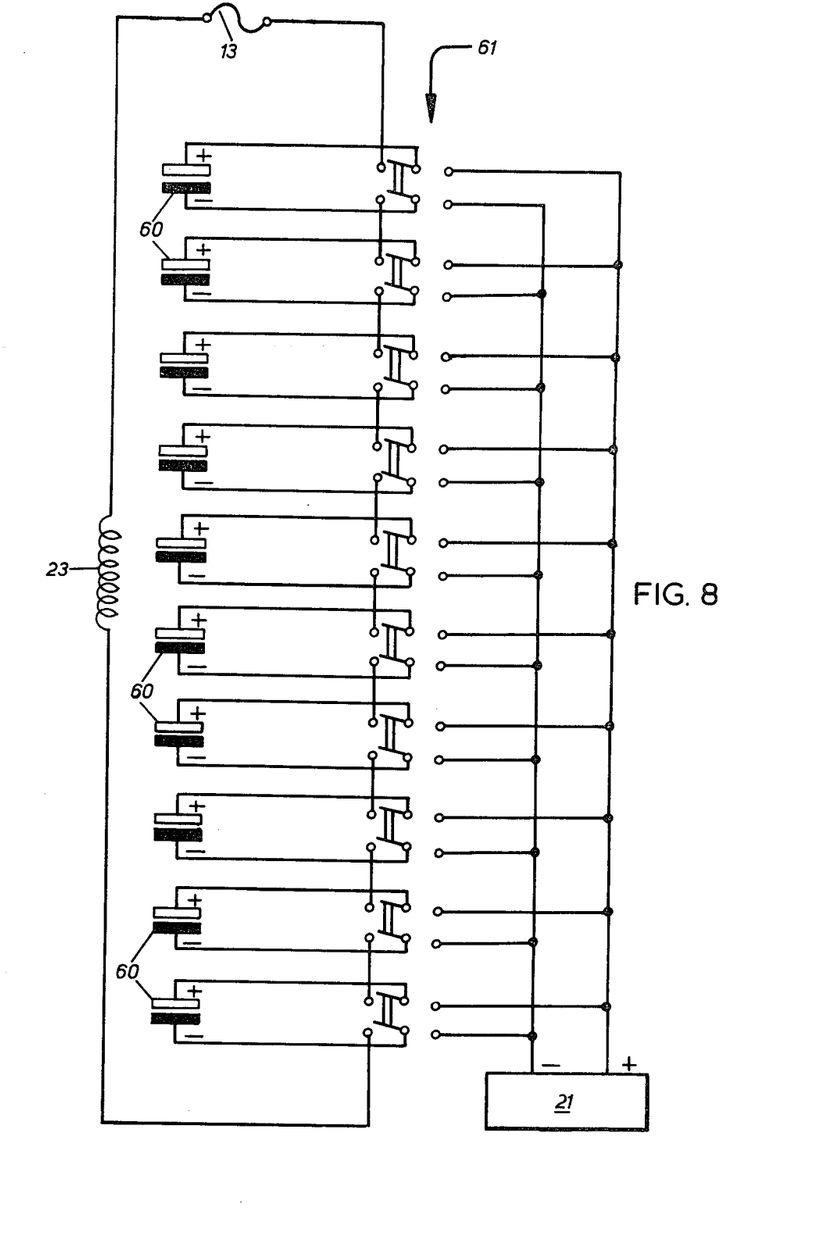
FIG. 8 is a circuit diagram of another embodiment of the invention relying on capacitive discharge.

FIG. 8 illustrates how the circuit of FIG. 6 may be modified using electrolytic capacitors. The capacitor 20 in each sub-circuit is replaced by ten 20,000 $\mu$F electrolytic capacitors 60 and the switch 22 by a system which has the effect of ten double-pole double-throw changeover switches 61 ganged for simultaneous changeover. By this arrangement the capacitors are charged in parallel and discharged in series, obviating special protection against massive discharge due to the breakdown of insulations, and also permitting the use of a voltage supply of the order of $\frac{1}{2}$ kV. For the purpose of this embodiment of the invention the supply 21 in FIG. 8 therefore denotes a terminal socket accessible to a source of power on land pre-flight.

Figure 9:
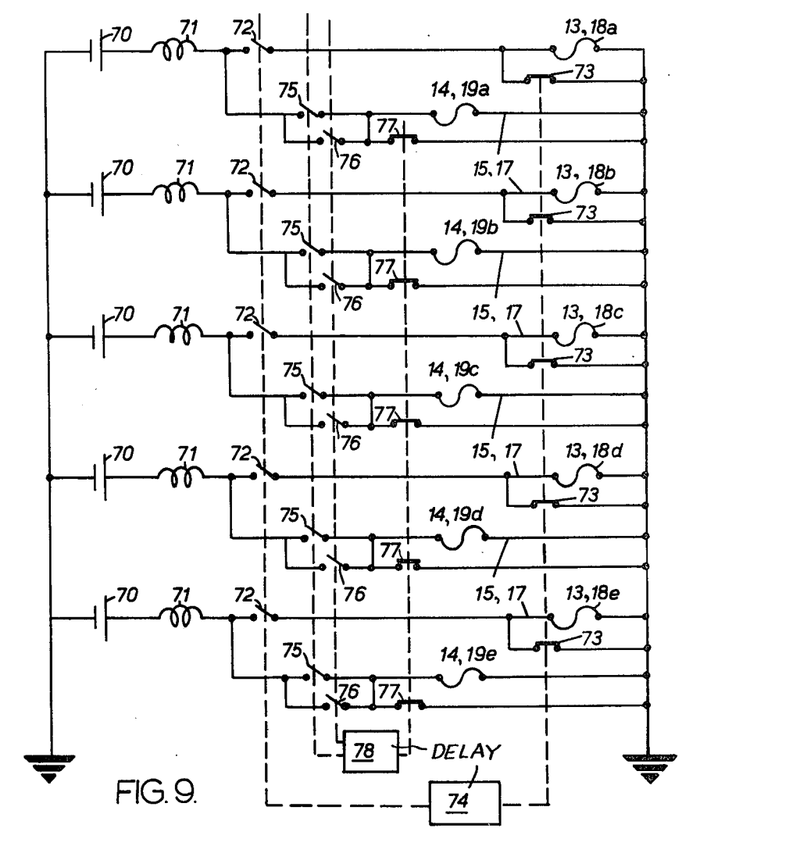
FIG. 9 is a circuit diagram of another embodiment of the invention relying on inductive discharge.

The circuit shown in FIG. 9 comprises five parallel sub-circuits, in a cockpit canopy shattering sub-system, and five parallel corresponding sub-circuits in a canopy removal sub-system, each corresponding sub-circuit sharing a common power source 70 and an inductance 71. In each shattering sub-circuit is an initiation switch 72 and a fusible element 13 (18), the element being by-passed by a by-pass switch 73. The switches 72 are ganged and associated with whatever control is used to initiate ejection. The by-pass switches 73 are ganged and arranged to be triggered by an ejection seat or other delay device 74 shortly after the commencement of ejection. The switches 72 and 73 are normally open and closed respectively.

In each canopy removal sub-circuit are two initiation switches 75, 76 in parallel and a fusible element 14 (19), the element being by-passed by a by-pass switch 77. The switches 75 are ganged and normally open and arranged for manual operation by the cockpit occupant. The switches 76 are ganged and normally open and arranged for manual operation externally of the aircraft. The by-pass switches 77 are ganged and arranged to be opened by a delay device 78 triggered by closing either of the switches 75 or 76.

The operation of the cockpit canopy shattering sub-system is as follows. Initiation of the ejection sequence closes the ganged switches 72. A surge of current from the power source 70 through the inductance 71 causes excitation thereof, to an energy equal to $\frac{1}{2}Li^2$ where L is the inductance in Henrys and i is the current in amps. This, upon opening of the switches 73 by the ejector seat, passes through the elements 13 (18) and fuses them, shattering the canopy before the ejector seat reaches it.

The operation of the canopy removal sub-system is similar. Closing the switches 75 by the aircrewman or the switches 76 by someone outside the aircraft initiates the current surge from the power source 70 and the excitation of the inductances 71, and commences operation of the delay device 78. Upon completion of the predetermined time interval the device 78 opens the by-pass switches 77 and the charge from the inductance fuses the elements 14 (19).

In a particular example of the FIG. 9 using elements of the type 13 described above 1000 amp 100 volt batteries (70) are used with 2 mH inductances (71), and the time delay between initiation and opening the switches 73 is of the order of 200 milliseconds. It will be appreciated that when the FIG. 2 embodiment is used in conjunction with the circuit of FIG. 9 the battery capacity required is considerably less than that quoted above.

Figure 10:
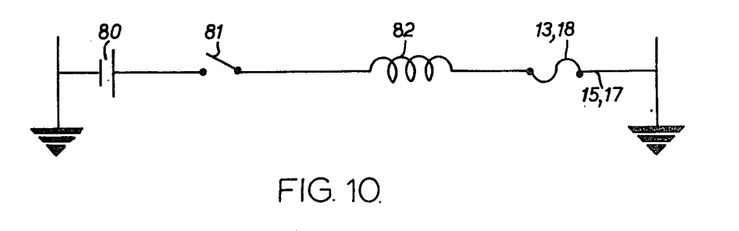
FIG. 10 illustrates an alternative form of the circuit shown in FIG. 9.

An alternative to the inductive system shown in FIG. 9 is illustrated in FIG. 10 which shows a canopy shattering sub-circuit comprising a battery 80, a switch 81, an inductance 82 in series with a fusible element 13 (18). The battery, inductance and element 13 (18) are so matched that the rise in output from the inductance 82 takes the same time as charging the inductance for self-excitation.

What has been described above is of course by way of example. Clearly other ways of carrying out the invention will occur to those skilled in the art, and such ways may indeed be more suitable in certain circumstances.

However, the use of a plurality of elements as particularly described means that the system need not be seriously impaired by the failure of one.

It is also possible that systems may be preferred which incorporate only the canopy shattering facility, this having the advantage of clearing the exit path even in a confined space, for example if the aircraft is upside down on the ground, though this is unlikely to be the case in the FIG. 2 embodiment as illustrated.

The systems described can readily be tested for continuity, certainly as far as the elements embedded within the canopy are concerned, which can give a measure of certainly of viability unavailable in explosive cord systems. Element test points may, therefore, be provided in the aircraft.

I claim:

1. A method of forming a breaking apparatus into a cockpit canopy and comprising the steps of providing a canopy inner shell and a canopy outer shell, forming a layer of resin on the designated inner surface of one of the shells, embedding into the resin a plurality of conductors each having at least one region of reduced energy of fusion, attaching the other shell to the resin, and curing the resin.

2. A method as claimed in claim 1 and wherein said conductors comprise metal tapes and comprising embedding said tapes in said resin with the tape faces as distinct from the edges lying in planes substantially normal to the shell surfaces local thereto.

3. Apparatus comprising a fusible electrical conductor incorporating at least one region of reduced energy of fusion compared with the mean in the conductor, said conductor being embedded in and in intimate contact with said panel, and said conductor being connectable to a source of a high energy pulse of electric power and operable to explode and thereby generate a crack in said panel and comprising also the high energy electrical pulse source and wherein said high energy electrical pulse source consists essentially of power supply means and at least one inductance arranged with an initiator switch and said at least one conductor in a circuit operable upon initiation to charge said inductance with energy, said inductance then providing a pulse operable to fuse said at least one conductor and having a bypass switch in a subcircuit operable to by-pass said inductance until said inductance is charged.

4. Aircraft cockpit canopy breaking apparatus comprising:
   a cockpit canopy,
   a plurality of metal tape conductors embedded in said canopy with their planes normal to the local canopy surface plane and in a pattern defining a region of said canopy in the path of an ejector seat and occupant thereof,
   a plurality of constrictions at intervals along said metal tapes,
   a plurality of electrical sub-circuits each containing at least one of said conductors,
   an inductance in each said sub-circuit,
   an inductance charge switch in each said sub-circuit and in series with said inductance, said at least one conductor and a power source,
   said switch being operable by initiation of an ejection sequence,
   a by-pass switch in parallel with said at least one conductor and operable after said inductance charge switch to direct power from said inductance through said at least one conductor and to fuse said at least one conductor.

* * * * *